(12) United States Patent
Nakayama

(10) Patent No.: US 11,068,751 B2
(45) Date of Patent: Jul. 20, 2021

(54) IMAGE PROCESSING DEVICE, IMAGE PROCESSING METHOD, AND STORAGE MEDIUM

(71) Applicant: NEC Corporation, Tokyo (JP)

(72) Inventor: Hikaru Nakayama, Tokyo (JP)

(73) Assignee: NEC CORPORATION, Tokyo (JP)

(*) Notice: Subject to any disclaimer, the term of this patent is extended or adjusted under 35 U.S.C. 154(b) by 120 days.

(21) Appl. No.: 16/490,953

(22) PCT Filed: Mar. 9, 2018

(86) PCT No.: PCT/JP2018/009197
§ 371 (c)(1),
(2) Date: Sep. 4, 2019

(87) PCT Pub. No.: WO2018/173800
PCT Pub. Date: Sep. 27, 2018

(65) Prior Publication Data
US 2020/0012899 A1 Jan. 9, 2020

(30) Foreign Application Priority Data

Mar. 21, 2017 (JP) .............................. JP2017-054140

(51) Int. Cl.
*G06K 9/62* (2006.01)
*G06N 20/00* (2019.01)
*G06N 5/04* (2006.01)

(52) U.S. Cl.
CPC ......... *G06K 9/6267* (2013.01); *G06K 9/6256* (2013.01); *G06N 5/04* (2013.01); *G06N 20/00* (2019.01)

(58) Field of Classification Search
CPC .. G06K 9/6267; G06K 9/6256; G06K 9/6262; G06N 20/00; G06N 5/04
(Continued)

(56) References Cited

U.S. PATENT DOCUMENTS

| 8,401,248 B1* | 3/2013 | Moon ................ G06K 9/00597 382/118 |
| 2005/0276481 A1* | 12/2005 | Enomoto ........... G06K 9/00597 382/190 |

(Continued)

FOREIGN PATENT DOCUMENTS

| JP | 5-257917 A | 10/1993 |
| JP | 2001-175870 A | 6/2001 |

(Continued)

OTHER PUBLICATIONS

International Search Report in International Application No. PCT/JP2018/009197, dated Jun. 5, 2018.
(Continued)

*Primary Examiner* — Juan A Torres
(74) *Attorney, Agent, or Firm* — Sughrue Mion, PLLC

(57) ABSTRACT

An image processing device has an extraction unit that extracts image data by using a predetermined sliding window in an original image; a learning unit that generates a prediction model by performing machine learning on learning data including the image data by using a teaching signal representing classification of the image data; and a select unit that selects, out of other image data different from the image data, another image data in which an error in classification based on the prediction model is larger than a predetermined threshold and adds the selected another image data to the learning data, and the learning unit updates the prediction model by repeating the machine learning in the learning data in which the another image data is added.

9 Claims, 8 Drawing Sheets

(58) Field of Classification Search
USPC .......................................................... 382/159
See application file for complete search history.

(56) References Cited

U.S. PATENT DOCUMENTS

2011/0202487 A1    8/2011   Koshinaka
2012/0033853 A1*   2/2012   Kaneda .............. G06K 9/00597
                                                        382/103

FOREIGN PATENT DOCUMENTS

JP    2004-260668 A    9/2004
WO    2010/047019 A1   4/2010

OTHER PUBLICATIONS

Satoshi Shirai, et al., "Detection of the Gaze Direction for Detection of the Driver's Status", IEICE technical report, Nov. 14, 2003, vol. 103, No. 453, pp. 67-72 (6 pages total).
Toshiyuki Amano, et al., "Image Interpolation by the High Dimensional Nonlinear Projection Using kBPLP Method", The translations of the Institute of Electronics, Information and Communication Engineers, Apr. 1, 2003, vol. J86-D-II, No. 4, pp. 525-534 (10 pages total).

* cited by examiner

IMAGE PROCESSING DEVICE, IMAGE PROCESSING METHOD, AND STORAGE MEDIUM

This application is a National Stage Entry of PCT/JP2018/009197 filed on Mar. 9, 2018, which claims priority from Japanese Patent Application 2017-054140 filed on Mar. 21, 2017, the contents of all of which are incorporated herein by reference, in their entirety.

TECHNICAL FIELD

The present invention relates to an image processing device, an image processing method, and a storage medium.

BACKGROUND ART

Image recognition technologies that automatically recognize a particular object in an image have been widely used. For example, Patent Literature 1 discloses a method for extracting a plurality of image data and searching for an object by using a sliding window scheme. The sliding window scheme is a scheme to search for an object by sliding a region of a predetermined window size at a predetermined slide width in the entire region of an original image.

CITATION LIST

Patent Literature

PTL 1: Japanese Patent Application Laid-Open No. 2004-260668

SUMMARY OF INVENTION

When a sliding window is used for a machine learning system, in order to increase accuracy of machine learning, it is preferable to reduce the slide width to use a large amount of image data as learning data. In this case, however, the amount of learning data becomes excessive, and thus the time required for machine learning may increase.

The present invention has been made in view of the problem described above and intends to provide an image processing device that can reduce the time for machine learning while increasing accuracy of machine learning in machine learning using a sliding window.

According to one example aspect of the present invention, provided is an image processing device that has an extraction unit that extracts image data by using a predetermined sliding window in an original image; and a learning unit that generates a prediction model by performing machine learning on learning data including the image data by using a teaching signal representing classification of the image data and further has a select unit that selects, out of other image data different from the image data, another image data in which an error in classification based on the prediction model is larger than a predetermined threshold and adds the selected another image data to the learning data, and the learning unit updates the prediction model by repeating the machine learning in the learning data in which the another image data is added.

According to another example aspect of the present invention, provided is an image processing method that has steps of extracting image data by using a predetermined sliding window in an original image; and generating a prediction model by performing machine learning on learning data including the image data by using a teaching signal representing classification of the image data and further has steps of selecting, out of other image data different from the image data, another image data in which an error in classification based on the prediction model is larger than a predetermined threshold and adding the selected another image data to the learning data; and updating the prediction model by repeating the machine learning in the learning data in which the another image data is added.

According to yet another example aspect of the present invention, provided is a storage medium that stores a program causing a computer to execute steps of extracting image data by using a predetermined sliding window in an original image; and generating a prediction model by performing machine learning on learning data including the image data by using a teaching signal representing classification of the image data, and the program is further causes the computer to execute steps of selecting, out of other image data different from the image data, another image data in which an error in classification based on the prediction model is larger than a predetermined threshold and adding the selected another image data to the learning data; and updating the prediction model by repeating the machine learning in the learning data in which the another image data is added.

According to the present invention, it is possible to provide an image processing device that can reduce the time for machine learning while increasing accuracy of machine learning.

DESCRIPTION OF EMBODIMENTS

First Example Embodiment

Figure 1:
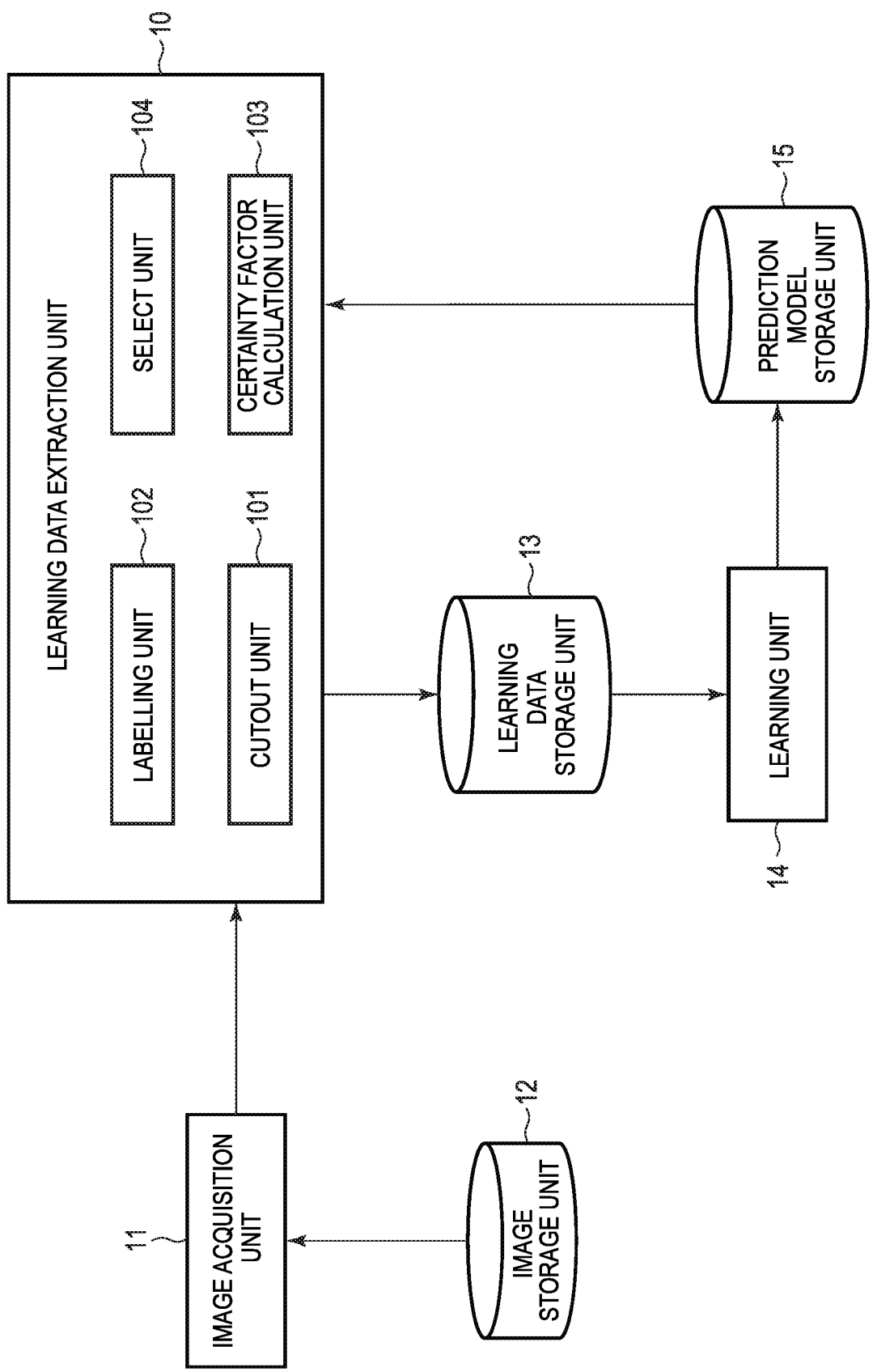
FIG. 1 is a block diagram illustrating a general configuration of an image processing device in a first example embodiment of the present invention.

FIG. 1 is a block diagram illustrating a general configuration of an image processing device according to a first example embodiment. The image processing device according to the present example embodiment generates learning data used for automatically performing learning for detecting a detection target (object) included in an original image and performs machine learning by using learning data. The image processing device has a learning data extraction unit 10, an image acquisition unit 11, an image storage unit 12, a learning data storage unit 13, a learning unit 14, and a prediction model storage unit 15. The learning data extraction unit 10 has a cutout unit 101, a labeling unit 102, a certainty factor calculation unit 103, and a select unit 104.

The image processing device according to the present example embodiment may function as an image recognition system by further having an image recognition function that detects a detection target from an original image by using a learning result. Further, by generating learning data with a single device, the generation function of learning data and the learning function using the learning data may be formed as separate devices.

The image storage unit 12 stores one or more original images used for machine learning. The original image may be either a static image or a moving image and may be any type such as a satellite photograph, an image by the surveillance camera, of the like, for example. The image acquisition unit 11 acquires the original image from the image storage unit 12 and transmits the image to the learning data extraction unit 10. The image acquisition unit 11 may perform image processing such as correction of a brightness histogram, noise reduction, or the like on the original image. The cutout unit 101 cuts out a plurality of image data while sliding a sliding window at a predetermined slide width in the original image. In the present example embodiment, the slide width can be changed, and in a first generation of learning data, the slide width is set to the maximum value, for example, a value wider than or equal to the width of the sliding window. In a second and subsequent generations of learning data, the slide width is sequentially set to a smaller value. The labeling unit 102 applies a label used for classifying the cut out image data. When a ship is included in image data as an object, for example, the labeling unit 102 applies a label such as "ship", "no_ship", or the like to the image data. The labeled image data is stored in the learning data storage unit 13 as learning data.

The learning unit 14 performs machine learning in learning data stored in the learning data storage unit 13. As described above, since the learning data includes the image data and the label, the learning unit 14 uses the label as a teaching signal and performs so-called supervised machine learning. The teaching signal may be two values of data representing a classification of labels or three or more values of discrete data representing a type of classification. The learning unit 14 constructs a classification reference by using a teaching signal and an image signal. An algorithm used for machine learning performed in the learning unit 14 may be, for example, deep learning, a Support Vector Machine (SVM), or the like. The learning result obtained by the learning unit 14 is stored in the prediction model storage unit 15 as a prediction model.

The certainty factor calculation unit 103 calculates a certainty factor in classification for each of the image data by using a prediction model under machine learning. The certainty factor here is a confidence degree to a classification result obtained by the prediction model. In general, in supervised machine learning, a score value (0 to 1) that classifies data is output, and the maximum output value is the certainty factor in classification. In the second and subsequent machine learning, the select unit 104 selects image data having a low certainty factor in classification out of a plurality of image data cut out by using a small slide width. That is, the select unit 104 selects image data in which an error between an output value based on a prediction model and an expected value such as a teaching signal is larger than a predetermined threshold and adds the selected image data to learning data. As described above, image data having a low certainty factor, that is, image data having a large error in classification contributes to accuracy improvement of a prediction model. In contrast, since image data having a high certainty factor does not significantly affect accuracy improvement of the prediction model, there is less necessity to add such data to learning data. Therefore, in the second and subsequent machine learning, the select unit 104 adds image data in which the error in classification is larger than a predetermined threshold to learning data, and the learning unit 14 updates the prediction model. The learning data extraction unit 10 and the learning unit 14 repeatedly perform the process described above until the error sufficiently approaches zero.

Figure 2:
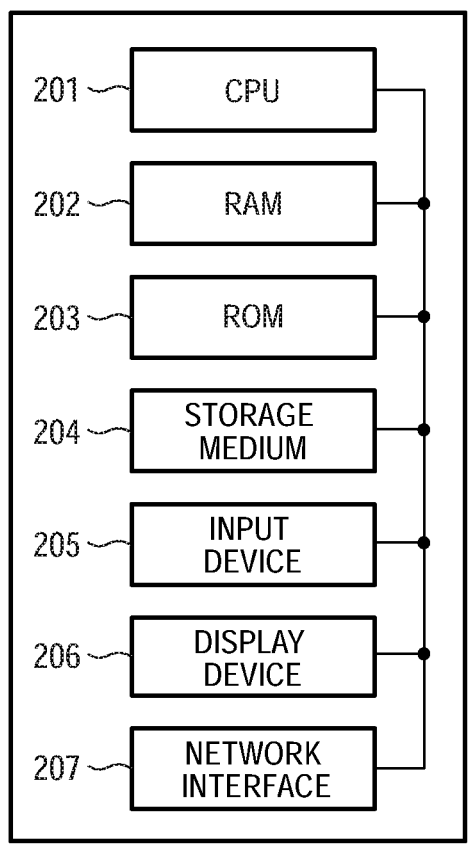
FIG. 2 is a hardware block diagram of the image processing device in the first example embodiment of the present invention.

FIG. 2 is a hardware block diagram of the image processing device according to the present example embodiment. The image processing device illustrated in FIG. 1 may be formed of a computer system of FIG. 2. The image processing device has a central processing unit (CPU) 201, a random access memory (RAM) 202, a read only memory (ROM) 203, a storage medium 204, an input device 205, a display device 206, and a network interface 207.

The CPU 201 performs a predetermined operation in accordance with a program stored in the ROM 203, the storage medium 204, or the like and also has a function of controlling each unit of the image processing device. Further, the CPU 201 executes a program for implementing functions of each unit of the learning data extraction unit 10, the image acquisition unit 11, the image storage unit 12, the learning data storage unit 13, the learning unit 14, and the prediction model storage unit 15.

The RAM 202 provides a temporary memory field required for the operation of the CPU 201. The ROM 203 is formed of a nonvolatile memory and stores necessary information such as a program used for the operation of the computer. The storage medium 204 is a mass storage device such as a hard disk. The RAM 202 or the storage medium 204 provides a storage region for implementing the function of each unit of the image storage unit 12, learning data storage unit 13, and the prediction model storage unit 15.

The input device 205 is a keyboard, a mouse, a touchscreen, or the like and is used by a user to operate the computer. The display device 206 is a liquid crystal display device or the like and is used to display an image, a character, or the like. The network interface 207 is a communication interface based on a standard such as Ethernet (registered trademark), Wi-Fi (registered trademark), or the like and is a module for communicating with another device.

Note that the hardware configuration illustrated in FIG. 2 is an example, and devices other than the devices described above may be added, or some devices may not be provided. For example, some functions may be provided by another device via a network, and the functions forming the present example embodiment may be distributed and implemented in a plurality of devices.

Figure 3:
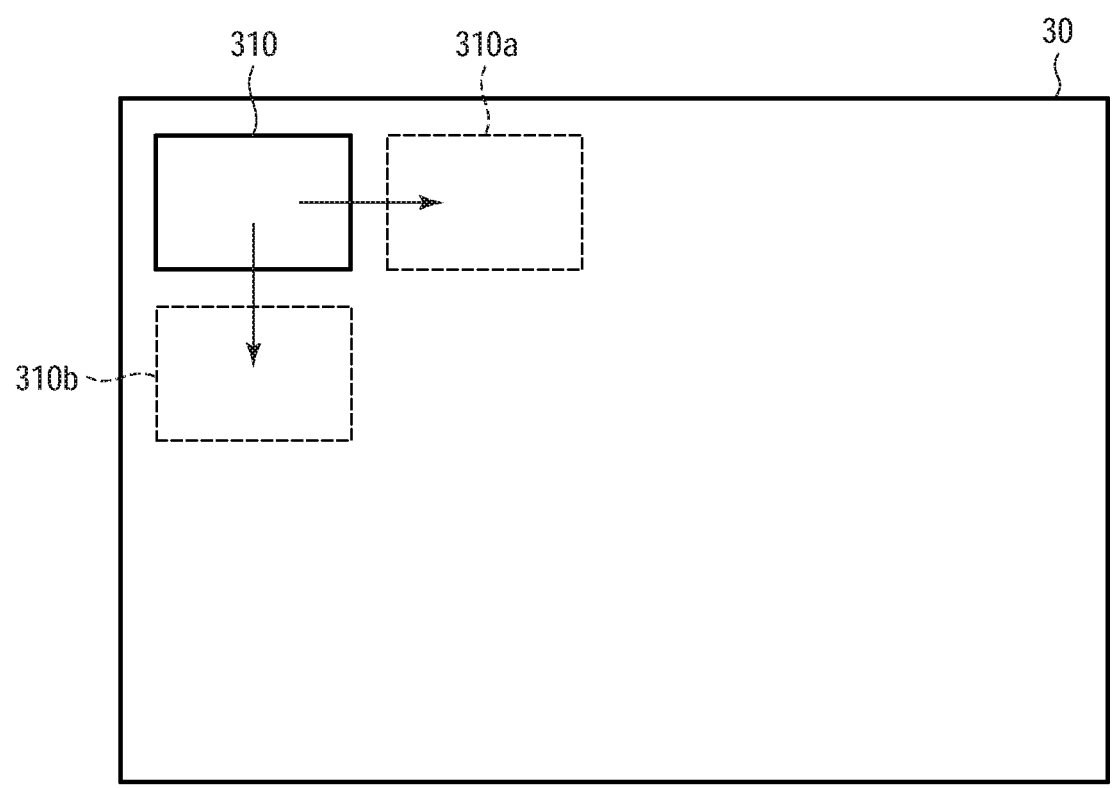
FIG. 3 is a diagram illustrating an example of a sliding window in the first example embodiment of the present invention.
Figure 4:
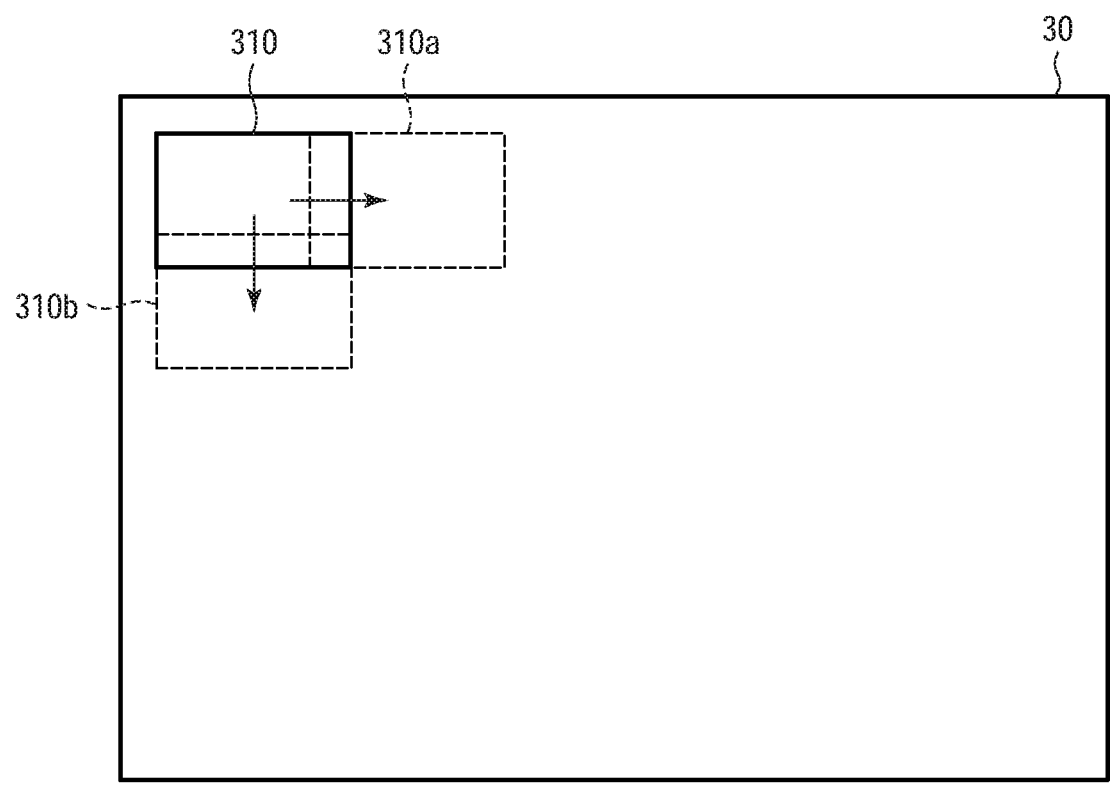
FIG. 4 is a diagram illustrating an example of the sliding window in the first example embodiment of the present invention.

FIG. 3 and FIG. 4 illustrate an example of a sliding window in the present example embodiment. The original image 30 may be high resolution data such as a satellite photograph, an aerial photograph, or the like, for example. While moving a rectangular sliding window 310 at a predetermined slide width in the original image, the cutout unit 101 cuts out image data in the sliding window 310. The cut out image data is stored as learning data together with a label. In the present example embodiment, different slide widths are set in the first machine learning and the second and subsequent machine learning. The slide width can be set in two axes orthogonal to each other, that is, the X-direction and the Y-direction in the original image 30, respectively. In the first machine learning, a first slide width may be set such that adjacent slide windows 310, 310a, and 310b do not overlap each other, for example (see FIG. 3).

In the second machine learning, a second slide width is set to a smaller value than the first slide width (see FIG. 4). Further, in a third and subsequent machine learning, the slide width is set to sequentially smaller values. As described above, by cutting out the image data while gradually reducing the slide width and adding new image data to learning data, it is possible to improve accuracy of machine learning. In the present example embodiment, as described below, in the second and subsequent machine learning, by adding image data contributing to accuracy improvement of machine learning to learning data, it is possible to reduce time for machine learning while improving accuracy of machine learning.

Figure 5:
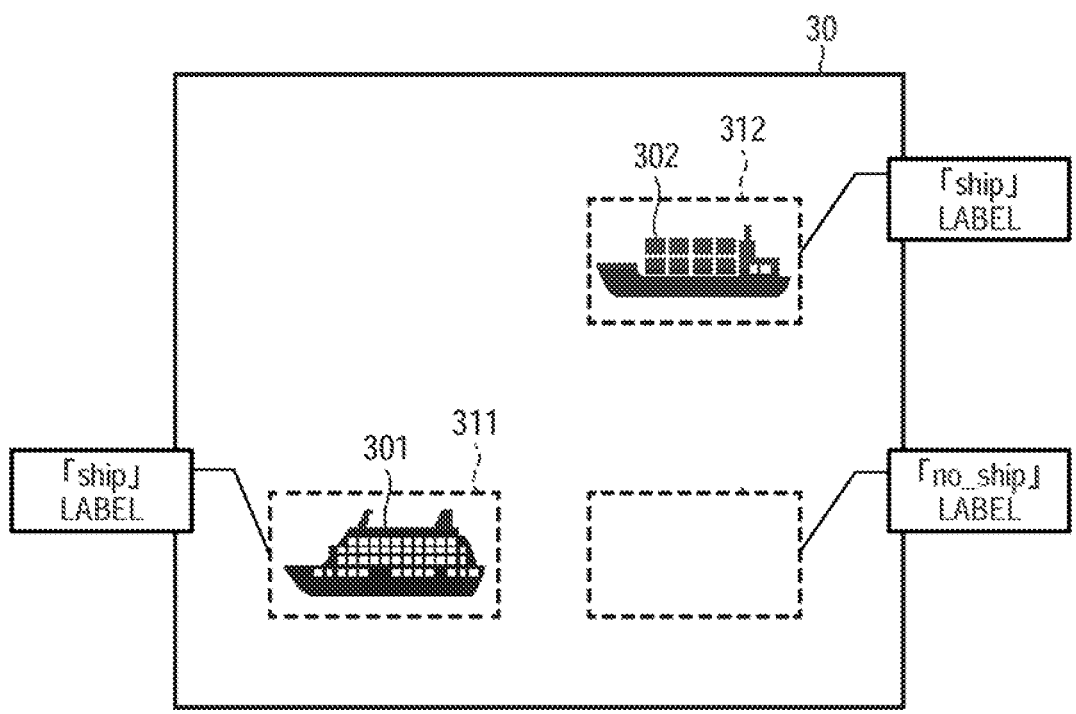
FIG. 5 is a diagram illustrating an example of an original image and image data in the first example embodiment of the present invention.

FIG. 5 illustrates an example of the original image and image data in the present example embodiment. Objects 301 and 302 of ships are included in portions of the original image 30. While moving a sliding window at a predetermined slide width in the original image 30, the cutout unit 101 cuts out image data in the sliding window. When sliding windows 311 and 312 are located so as to surround the objects 301 and 302, for example, a label "ship" is applied to the cut out image data by the labeling unit 102. On the other hand, when no object is included in the cut out image data, a label "no_ship" is applied to the image data by the labeling unit 102. In such a way, the labeled image data is stored in the learning data storage unit 13 as learning data, and the supervised machine learning in learning data is performed by the learning unit 14.

Figure 6:
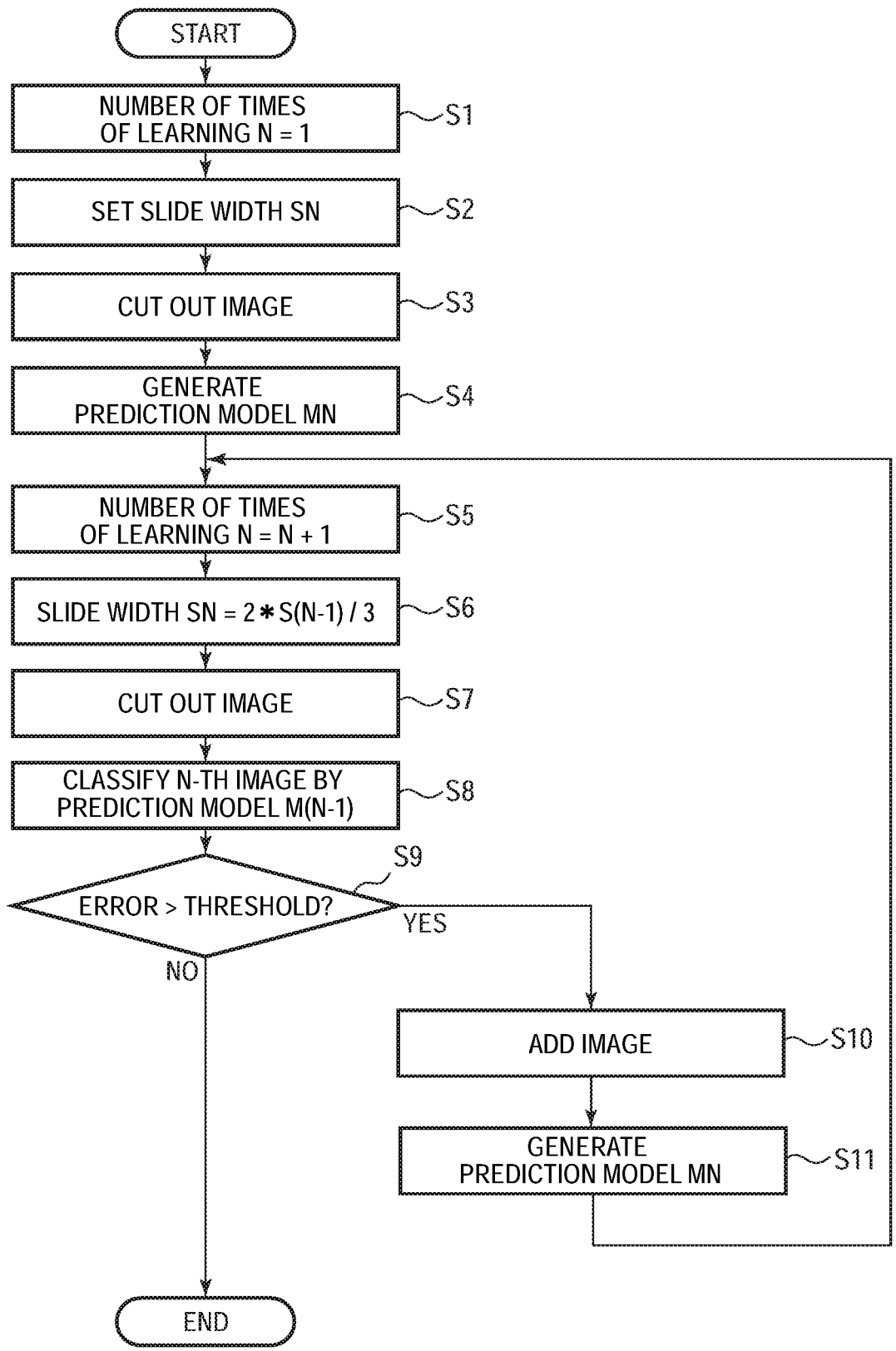
FIG. 6 is a flowchart representing an operation of the image processing device in the first example embodiment of the present invention.
Figure 7:
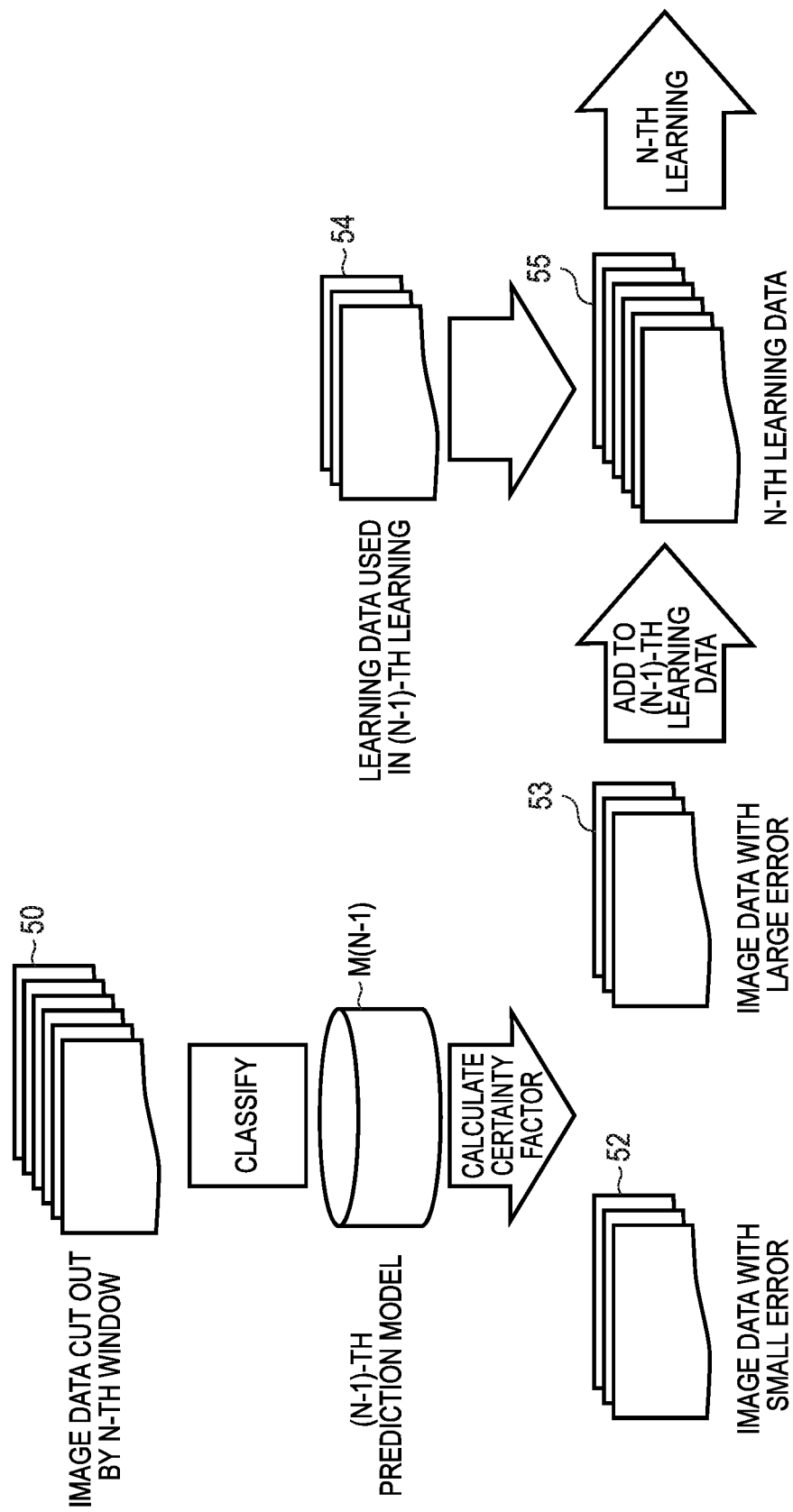
FIG. 7 is a diagram representing the summary of machine learning in the first example embodiment of the present invention.

Subsequently, an operation of the image processing device in the present example embodiment will be described with reference to FIG. 6 and FIG. 7. FIG. 6 is a flowchart representing the operation of the image processing device in the present example embodiment, and FIG. 7 is a diagram representing an algorithm of machine learning in the present example embodiment.

First, the image acquisition unit 11 reads the original image from the image storage unit 12 and transmits the read image to the learning data extraction unit 10. The learning data extraction unit 10 sets a variable n, which represents the number of times of learning, to "1" (step S1). Further, the learning data extraction unit 10 sets a size and a slide width Sn of the sliding window to the initial values, respectively (step S2). As described above, the slide width Sn can be set in the X-direction and the Y-direction, respectively, and may be set in accordance with in the X-direction length and the Y-direction length of the sliding window. The size of the sliding window may be set to a constant value. The cutout unit 101 sequentially cuts image data out of the original image while moving the sliding window for each set slide width Sn (step S3). The labeling unit 102 classifies the image data in accordance with the presence or absence or the type of the object in the cut out image data and applies a label to the image data. The learning data storage unit 13 stores the labeled image data as learning data 54. The learning unit 14 performs supervised machine learning while referencing to the label in the learning data 54 and generates a prediction model Mn (step S4). After the average error in the prediction model Mn has sufficiently decreased, the learning unit 14 stores the prediction model Mn in the prediction model storage unit 15.

Subsequently, the learning data extraction unit 10 adds "1" to the variable n and sets the number of times of learning to "2" (step S5). The learning data extraction unit 10 sets the slide width Sn to Sn=2×S(n−1)/3 (step S6). That is, a second slide width S2 is set to 75% of a first slide width S1. The cutout unit 101 moves the sliding window for each slide width S2 and cuts out image data 50 (step S7). The labeling unit 102 applies a label to the second image data 50.

The certainty factor calculation unit 103 classifies the second image data 50 by using the first prediction model Mn, that is, a prediction model M1 and calculates a certainty factor (step S8). The select unit 104 calculates an error between the certainty factor and an expected value for each image data 50 and determines whether or not the error exceeds a predetermined threshold (step S9). The select unit 104 selects image data 53 in which the error exceeds the predetermined threshold out of a plurality of the image data 50 (step S9, YES) and adds the selected image data 53 to the first learning data 54 (step S10). On the other hand, image data 52 having the error smaller than or equal to the predetermined threshold is discarded without being added to the learning data 54 because of having less effect on accuracy improvement. As described above, the selected second image data 53 is added to the first learning data 54, and a second learning data 55 is stored in the learning data storage unit 13. The learning unit 14 performs machine learning in the second learning data 55 and generates a second prediction model M2 (step S11). Subsequently, the image processing device returns the process to step S5 and performs third machine learning. That is, the learning data extraction unit 10 sets a third slide width S3 to 75% of the second slide width S2 (step S6), and the cutout unit 101 cuts out image data more finely (step S7). The certainty factor calculation unit 103 classifies third image data by using the second prediction model M2 and calculates a certainty factor (step S8). As described above, if addition of image data to learning data reduces an error of the prediction model Mn to a value smaller than or equal to the threshold (step S9, NO), the image processing device ends machine learning.

According to the present example embodiment, by cutting out image data while gradually reducing the slide width and adding another image data to learning data, it is possible to improve accuracy of machine learning. Further, in the second and subsequent learning, it is possible to reduce the learning time by adding image data contributing to improvement in learning accuracy to the learning data.

Second Example Embodiment

In the first example embodiment, image data is cut out while a sliding window is moved over the entire original image. In the present example embodiment, it is possible to further accelerate machine learning by setting a slide width finely in a specified region. For example, in image data including a portion of an object, the error in classification is likely to be relatively large. Such image data contributes to accuracy improvement of a prediction model. Therefore, when a border of an object is included in the sliding window, it is preferable to reduce the slide width to add more image data having a large error to learning data.

According to the present example embodiment, it is possible to improve accuracy of machine learning while further reducing the time for machine learning.

Third Example Embodiment

In the first example embodiment, all the image data cut out by the sliding window is used for the first machine learning. In the present example embodiment, in the same manner as in the second and subsequent machine learning, only image data having a larger error may be used as learning data also in the first learning. It is thus possible to further reduce the time for machine leaning. That is, by using only image data contributing to accuracy improvement of a prediction model as learning data, it is possible to efficiently perform machine learning.

Fourth Example Embodiment

Figure 8:
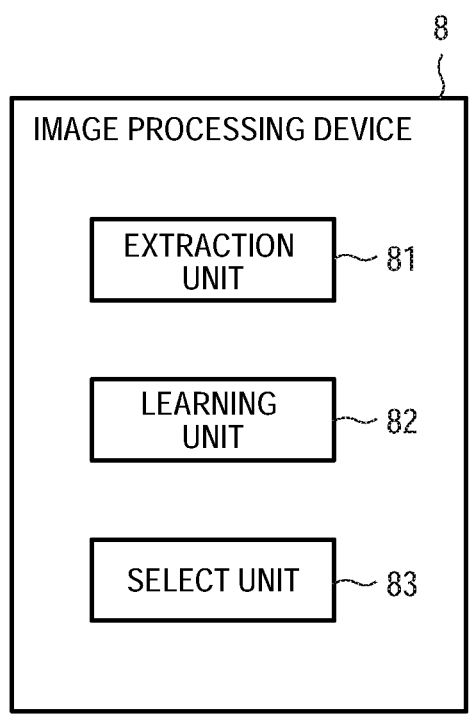
FIG. 8 is a block diagram of an image processing device in a fourth example embodiment of the present invention.

FIG. 8 is a block diagram of an image processing device in the present example embodiment. The image processing device 8 in the present example embodiment includes an extraction unit 81, a learning unit 82, and a select unit 83. The extraction unit 81 extracts image data by using a predetermined sliding window in an original image. The learning unit 82 generates a prediction model by performing machine learning on learning data including image data by using a teaching signal expressing classification of image data. The select unit 83 selects, out of other image data different from the image data, another image data in which an error in classification based on the prediction model is larger than the predetermined threshold and adds the selected another image data to learning data. Further, the learning unit 82 updates the prediction model by repeating machine learning in learning data in which the another image data is added.

According to the present example embodiment, by repeating machine learning while adding another image data contributing to accuracy improvement of machine learning to learning data, it is possible to provide an image processing device that can reduce the time for machine learning while increasing accuracy of machine learning.

Modified Example Embodiments

The present invention is not limited to the example embodiments described above and can be appropriately changed within the scope not departing from the scope of the present invention.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on an operation system (OS) to perform a process in cooperation with another software or a function of an add-in board without being limited to an example that performs a process by an individual program stored in the storage medium.

Note that each of the example embodiments described above merely illustrates an example of embodiments in implementing the present invention, and the technical scope of the present invention should not be construed in a limiting sense by these example embodiments. That is, the present invention can be implemented in various forms without departing from the technical concept or the primary features.

The whole or part of the example embodiments disclosed above can be described as, but not limited to, the following supplementary notes.

What is claimed is:

1. An image processing device comprising:
an extraction unit that extracts image data by using a predetermined sliding window in an original image;
a learning unit that generates a prediction model by performing machine learning on learning data including the image data by using a teaching signal representing classification of the image data; and
a select unit that selects, out of other image data different from the image data, another image data in which an error in classification based on the prediction model is larger than a predetermined threshold and adds the selected another image data to the learning data, and
wherein the learning unit updates the prediction model by repeating the machine learning in the learning data in which the another image data is added,
wherein the image data is extracted by moving the sliding window at a first slide width, and
wherein the another image data is extracted by moving the sliding window at a second slide width that is narrower than the first slide width.

2. The image processing device according to claim 1, wherein the select unit selects the image data in which an error in classification based on the prediction model is larger than a predetermined threshold out of the image data and adds the selected image data to the learning data.

3. The image processing device according to claim 1, wherein the learning unit repeats the machine learning until the average error in the learning data becomes smaller than or equal to a predetermined value.

4. The image processing device according to claim 1, wherein the extraction unit extracts the image data that includes a portion of an object in the original image.

5. The image processing device according to claim 1, wherein the sliding window has a rectangular shape.

6. The image processing device according to claim 1, wherein the first and the second slide widths are configured to be set for each of two orthogonal axes in the original image.

7. The image processing device according to claim 1, wherein the teaching signal is a signal based on a label applied to the image data.

8. An image processing method comprising steps of:
extracting image data by using a predetermined sliding window in an original image;
generating a prediction model by performing machine learning on learning data including the image data by using a teaching signal representing classification of the image data;
selecting, out of other image data different from the image data, another image data in which an error in classification based on the prediction model is larger than a predetermined threshold and adding the selected another image data to the learning data; and
updating the prediction model by repeating the machine learning in the learning data in which the another image data is added, wherein the image data is extracted by moving the sliding window at a first slide width, and wherein the another image data is extracted by moving the sliding window at a second slide width that is narrower than the first slide width.

9. A non-transitory storage medium that stores a program causing a computer to execute steps of:

extracting image data by using a predetermined sliding window in an original image;

generating a prediction model by performing machine learning on learning data including the image data by using a teaching signal representing classification of the image data;

selecting, out of other image data different from the image data, another image data in which an error in classification based on the prediction model is larger than a predetermined threshold and adding the selected another image data to the learning data; and updating the prediction model by repeating the machine learning in the learning data in which the another image data is added, wherein the image data is extracted by moving the sliding window at a first slide width, and wherein the another image data is extracted by moving the sliding window at a second slide width that is narrower than the first slide width.

* * * * *